Jan 6, 1931.　　F. H. HUMPHREY　　1,787,865
BELT TIGHTENER
Filed July 31, 1929
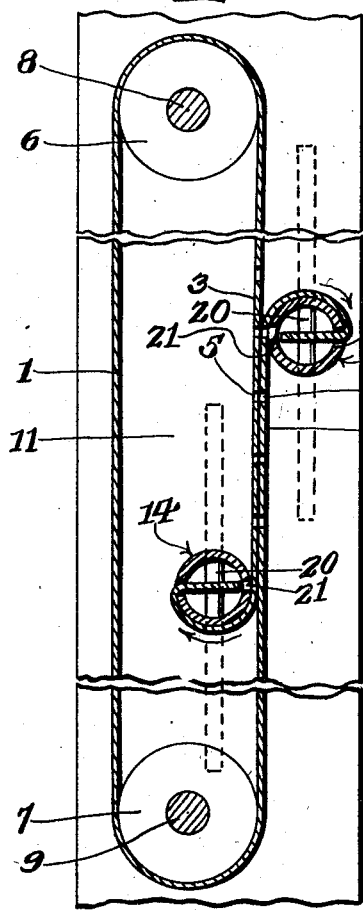
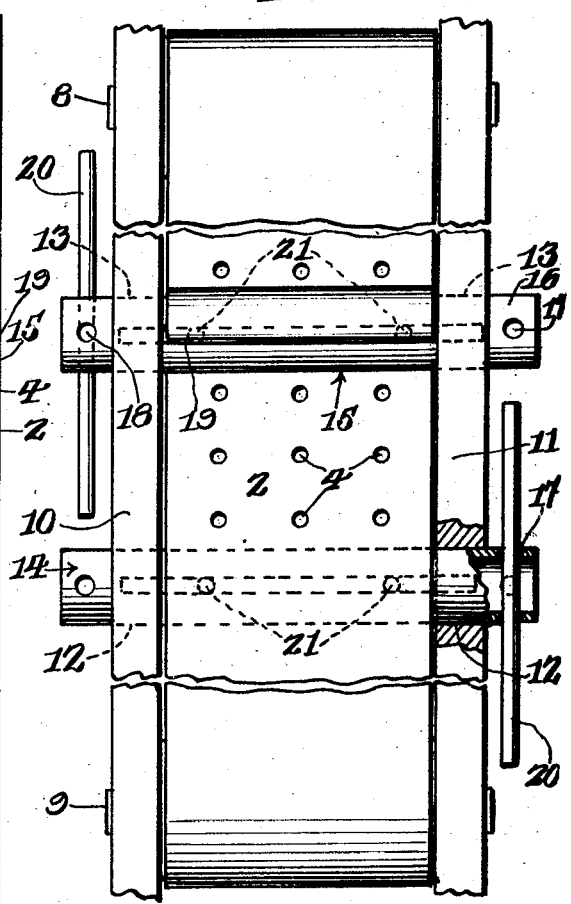
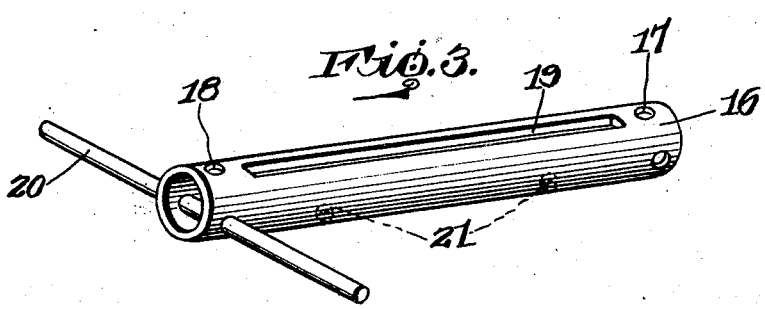
INVENTOR.
Frank H. Humphrey,
BY
Geo. P. Kimmel
ATTORNEY.

Patented Jan. 6, 1931

1,787,865

UNITED STATES PATENT OFFICE

FRANK H. HUMPHREY, OF MITCHELL, SOUTH DAKOTA

BELT TIGHTENER

Application filed July 31, 1929. Serial No. 382,366.

This invention relates to a belt tightener designed primarily for use in connection with cup belts of grain elevators, but it is to be understood that a belt tightening means, in accordance with this invention may be employed in any connection for which it is found applicable, and the invention has for its object to provide, in a manner as hereinafter set forth, means for effectively tightening belts and removing the slack therefrom prior to the connecting of the end terminal portions of the belt together.

A further object of the invention is to provide, in a manner as hereinafter set forth, means for expeditiously drawing together the ends of a belt to overcome any slack in the latter and further for maintaining the belt taut during the coupling of the end terminal portions of the belt together and further with such means capable of being readily removed from the belt after the end terminal portions of the latter have been coupled or secured together.

Further objects of the invention are to provide, in a manner as hereinafter set forth, a belt tightening means for the purpose referred to and which is simple in its construction and arrangement, strong, durable, compact, thoroughly efficient in its use, conveniently operated, readily installed with respect to the belt for drawing the same taut, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a vertical sectional view of a belt showing the adaptation therewith of a tightening means therefor in accordance with this invention and with the tightening means further shown in section and with the belt broken away.

Figure 2 is a front elevation, broken away, of a belt and its support and further showing the adaptation therewith, in full and in dotted lines of a belt tightening means in accordance with this invention and with one of the tightening elements broken away and partly in section.

Figure 3 is a perspective view of the form of tightening element employed.

The belt 1, is illustrated by way of example, as of the elevating and lowering type, but it is to be understood that a belt tightening means, in accordance with this invention may be employed in connection with horizontally, longitudinally and angularly disposed belts employed for various purposes.

The end terminal portions of the belt 1 are indicated at 2, 3 and are provided with openings 4, 5 adapted to register for the passage of a lacing or other means, not shown, for coupling the end terminal portions 2, 3 together. The belt 1 is illustrated as drawn taut around a pair of spaced, superposed pulleys 6, 7 which are carried by shafts 8, 9 respectively. A pair of supports, in the form of uprights 10, 11 oppose the side edges of the belt. The shafts 8, 9 are journaled in the uprights 10, 11. The pulleys 6, 7 extend substantially from the inner face of one upright to the inner face of the other. The width of belt 1 is slightly less than the length of the pulleys. The shafts 8, 9 are journaled in the uprights between the longitudinal median of each upright and one side edge of the latter. The diameter of each pulley is materially less than the transverse width of each upright and by this arrangement the front and rear stretches of the belt are spaced inwardly from the side edges of the uprights. One of the pulleys is an idler pulley and the other one is adapted to have a driving means, not shown therefor operatively connected therewith.

The uprights or side members 10, 11 provide supports for removably supporting the belt tightening means in accordance with this invention and for such purpose each support or side member is formed with an opening 12 and an opening 13. The opening 12 is arranged a substantial distance below the opening 13 and is termed the forward opening and the opening 13 is termed the rear opening. The opening 12 is arranged in advance of the opening 13. The opening 12 is positioned between the front and rear stretches of the belt 1 and the opening 12 arranged rearwardly of the rear stretch of the belt 1. The opening 13 in the upright or side member 10 aligns with the opening 13 of the upright or side member 11 and the opening 12 in the side member 10 is arranged in alignment with the opening 12 formed in the side member or upright 11.

The belt tightening means includes a pair of rotatable, tubular elements referred to generally at 14, 15 and as each of said elements is of the same construction, but one will be described as the description of one will apply to the other. Each rotatable tubular element comprises a tubular body portion 16 which is open at each end and provided in proximity to one end with aligning openings 17 and in proximity to its other end with aligning openings 18. The body portion 16 is formed with a lengthwise extending, rectangular slot 19 which extends from a point in close proximity to one of the openings 17 to a point in close proximity to one of the openings 18. The registering openings 17, as well as the registering openings 18 are provided for the passage of a handle member 20 to enable the manual rotation of the body portion 16. The tubular element 14 is mounted in the aligning openings 12 and is of a length to project a substantial distance from the uprights or side members 10, 11 whereby the openings 17 and 18 will be arranged a substantial distance from said side members or uprights. The element 15 is rotatably mounted in the aligning openings 13 and is of a length to extend a substantial distance from the uprights or side members 10, 11 and in a manner whereby the openings 17, 18 of the element 15 will be spaced a substantial distance from the said side members or uprights. The length of the slot 19 is greater than the distance between the opposed faces of the uprights or side members 10, 11. The element 14 is arranged below and forwardly of the element 15.

The end portion 2 is adapted to extend through the slot 19 formed in the element 15 and is bent around the periphery of element 15. The end portion 3 extends through the slot 19 of element 14 into the latter and then extends around the periphery of element 14. When the end portion 2 is connected to element 15 it is oppositely disposed with respect to the end portion 3 when the latter is connected to the element 14.

The elements 14 and 15 are rotated in the direction of the arrows, Figure 1, for the purpose of drawing the end terminal portions 2, 3 together to remove all slack from the belt 1. The elements 14 and 15 are revolved or rotated to shift the end terminal portions 2, 3 the desired extent and to provide for registration of the openings 4, 5, through which is adapted to extend coupling means for securing the end terminal portions together. The belt 1 is maintained taut by the elements 14, 15 during the coupling operation, and after the coupling operation the end terminal portions are severed from the elements 14, 15 and the elements removed from the uprights or side members 10, 11. Rotation of the elements 14 and 15 is had through the medium of the handle bars or members 20. The belt 1 is drawn taut around the pulleys 6, 7, by the elements 14, 15. The pulleys 6, 7 may be rollers or shafts. The elements 14, 15 provide for the winding thereon of the end terminal portions of the belt body. The elements 14, 15 do not align and as one element is arranged forwardly of the other a clearance or space is provided for the end terminal portions of the belt when such portions are pulled towards each other. The clearance or space is of an area to provide for the opposed faces of the end terminal portions of the belt body to be arranged in close proximity or to abut. The normal position of the slot in element 14 is at the rear side of the latter, and the normal position of the slot in element 15 is at the forward side of the latter. The normal position of elements 14, 15 is oppositely disposed with respect to each other, due to the normal position of the slots. The slots of elements 14, 15 provide for connecting the end terminal portions of the belt body therewith, prior to the rotation of the element, whereby when the elements are rotated the end terminal portions of the belt body will wind in opposite directions upon the elements 14, 15 under such conditions drawing the belt tightly around the spaced pulleys, rollers or shaft.

The body portion 16 of the elements 14, 15 is formed with a pair of spaced openings 21 on that side thereof opposite the side provided with the slot 19. The openings 21 and slot 19 are diametrically disposed with respect to the body portion 16. The openings 21 are positioned at points inwardly with respect to the ends of slot 19. The openings 21 in the body portion 16 in connection with the slot 19 in the latter permit of a wire rope or cable to be run through the body portion 16 for attaching to a belt when broken or when putting in a new belt. The rope or cable passing over a pulley and the element 14 or 15 to which the rope or cable is attached act as a windlass.

It is thought the many advantages of a belt tightening means, in accordance with this invention and for the purpose set forth can be readily understood, and although the preferred embodiment of the invention is as

What I claim is:

1. A belt tightening means comprising a pair of non-aligning, spaced, rotatable, removably mounted, tubular belt body winding elements adapted to be transversely disposed outwardly and inwardly with respect to the inner stretch of a belt arranged in traversing position with respect to its pulleys or rolls and with its ends free of connection with each other, one of said elements arranged slightly in advance of the other for the passage for the free end portions of the belt, each of said elements provided with a lengthwise extending slot for the passage therein of an end of the belt to connect the latter therewith, one of said elements normally having its slot on its inner side and the other on its outer side, and means for rotating said elements to wind the end portions of the belt body thereon to draw the belt taut and to maintain it taut prior to and during coupling of the ends thereof together.

2. A belt tightening means comprising a pair of nonaligning, spaced, rotatable, removably mounted, tubular belt body winding elements adapted to be transversely disposed outwardly and inwardly with respect to the inner stretch of a belt arranged in traversing position with respect to its pulleys or rolls and with its ends free of connection with each other, one of said elements arranged slightly in advance of the other for the passage of the free end portions of the belt, each of said elements provided with a lengthwise extending slot for the passage therein of an end of the belt to connect the latter therewith, one of said elements normally having its slot on its inner side and the other on its outer side, each of said elements having its body provided with openings near each end, and means extending through certain of said openings for rotating said elements to wind the end portions of the belt body thereon to draw the belt taut and to maintain it taut prior to the coupling of the end portions together.

3. A belt tightening means comprising a pair of nonaligning, spaced, rotatable, removably mounted, tubular belt body winding elements adapted to be transversely disposed outwardly and inwardly with respect to the inner stretch of a belt arranged in traversing position with respect to its pulleys or rolls and with its ends free of connection with each other, one of said elements arranged slightly in advance of the other for the passage of the free end portions of the belt, each of said elements provided with a lengthwise extending slot for the passage therein of an end of the belt to connect the latter therewith, one of said elements normally having its slot on its inner side and the other on its outer side, and means for rotating said elements to wind the end portions of the belt body thereon to draw the belt taut and to maintain it taut prior to and during coupling of the ends thereof together, each of said elements and its slot being of greater length than the width of the belt.

4. A belt tightening means comprising a pair of nonaligning, spaced, rotatable, removably mounted, tubular belt body winding elements adapted to be transversely disposed outwardly and inwardly with respect to the inner stretch of a belt arranged in traversing position with respect to its pulleys or rolls and with its ends free of connection with each other, one of said elements arranged slightly in advance of the other for the passage of the free end portions of the belt, each of said elements provided with a lengthwise extending slot for the passage therein of an end of the belt to connect the latter therewith, one of said elements normally having its slot on its inner side and the other on its outer side, each of said elements having its body provided with openings near each end, and means extended through certain of said openings for rotating said elements to wind the end portions of the belt body thereon to draw the belt taut and to maintain it taut prior to the coupling of the end portions together, each of said elements and its slot being of greater length than the width of the belt.

5. In a belt tightening means, a rotatable belt body winding element consisting of a tubular member formed with a lengthwise extending slot and a pair of openings diametrically opposite said slot and arranged at points inwardly with respect to the ends of the slot to provide in connection with the latter for the passage of a pulling element diametrically through said member.

6. In a belt tightening means, a rotatable belt body winding element consisting of a tubular member formed with a lengthwise extending slot and a pair of openings diametrically opposite said slot and arranged at points inwardly with respect to the ends of the slot to provide in connection with the latter for the passage of a pulling element diametrically through said member, and said member having each end thereof provided with means outwardly with respect to the ends of said slot adapted for selectively attaching to said ends a means for rotating said element.

7. In a belt tightening means, a rotatable belt body winding element consisting of a tubular member formed with a lengthwise extending slot and a pair of openings diametrically opposite said slot and arranged at points inwardly with respect to the ends of the slot to provide in connection with the latter for the passage of a pulling element diametrically through said member, and said member being provided at each end with a set of aligning openings adapted for selectively connecting with the ends thereof means for rotating said element.

8. A belt tightening means comprising a pair of oppositely disposed, removably mounted, rotatable belt body winding elements of tubular form and each provided with a lengthwise slot for the passage therein of an end portion of the belt body to connect the latter to the element, said elements arranged in spaced relation and one in advance of the other for the passage therebetween of the end portion of the belt body prior to the coupling together of said end portions, and means connected to one end of each element for rotating it to wind the belt body thereon to draw the belt taut and to maintain it in such condition prior to and during the securing of the end portions of the belt body together.

In testimony whereof, I affix my signature hereto.

FRANK H. HUMPHREY.